(12) United States Patent
Wang

(10) Patent No.: US 12,356,012 B2
(45) Date of Patent: Jul. 8, 2025

(54) SIGNALING SUBPICTURE IDS IN SUBPICTURE BASED VIDEO CODING

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 17/696,485

(22) Filed: Mar. 16, 2022

(65) Prior Publication Data

US 2022/0210477 A1 Jun. 30, 2022

Related U.S. Application Data

(63) Continuation of application No. PCT/US2020/050835, filed on Sep. 15, 2020.

(60) Provisional application No. 62/901,552, filed on Sep. 17, 2019.

(51) Int. Cl.
*H04N 19/70* (2014.01)
*H04N 19/172* (2014.01)

(52) U.S. Cl.
CPC ........... *H04N 19/70* (2014.11); *H04N 19/172* (2014.11)

(58) Field of Classification Search
CPC .... H04N 19/60; H04N 19/186; H04N 19/176; H04N 19/70; H04N 19/172
See application file for complete search history.

(56) References Cited

U.S. PATENT DOCUMENTS

| | | | |
|---|---|---|---|
| 2013/0202051 A1 | 8/2013 | Zhou | |
| 2013/0272619 A1* | 10/2013 | Deshpande | H04N 19/68 382/232 |
| 2014/0086332 A1 | 3/2014 | Wang | |
| 2014/0086342 A1* | 3/2014 | Wang | H04N 19/31 375/240.28 |
| 2014/0092963 A1 | 4/2014 | Wang | |
| 2015/0195545 A1* | 7/2015 | Wang | H04N 19/103 375/240.02 |

(Continued)

FOREIGN PATENT DOCUMENTS

| | | |
|---|---|---|
| CN | 107615763 A | 1/2018 |
| EP | 2759130 B1 | 8/2020 |

(Continued)

OTHER PUBLICATIONS

Wang et al, "Signaling subpicture coded video sequences", Mar. 2019, JVET of ITU-T SG 16 WP 3 and ISO/IEC JTC 1/SC 29/WG 11, vol. 1, 3 pages (Year: 2019).*

(Continued)

*Primary Examiner* — Shawn S An
(74) *Attorney, Agent, or Firm* — Conley Rose, P.C.

(57) ABSTRACT

A method of video decoding comprises receiving a bitstream including a SPS, a PPS, and subpictures associated with a subpicture ID mapping. A determination is made of whether an SPS flag has a first or second value. The SPS flag having the first value specifies that the subpicture ID mapping is signaled in the SPS, and the second value specifies that the subpicture ID mapping is signaled in the PPS. The subpicture ID mapping is obtained from the SPS when the SPS flag has the first value and from the PPS when the SPS flag has the second value or the PPS flag has the first value.

26 Claims, 10 Drawing Sheets

(56) References Cited

U.S. PATENT DOCUMENTS

| | | | |
|---|---|---|---|
| 2015/0195577 A1* | 7/2015 | Hannuksela | H04N 19/70 375/240.25 |
| 2015/0304671 A1 | 10/2015 | Deshpande | |
| 2016/0219283 A1* | 7/2016 | Chen | H04N 19/105 |
| 2017/0034526 A1* | 2/2017 | Rapaka | H04N 19/105 |
| 2017/0085917 A1* | 3/2017 | Hannuksela | H04N 19/136 |
| 2018/0288437 A1 | 10/2018 | Hsiang | |
| 2018/0295364 A1* | 10/2018 | Liu | H04N 19/186 |
| 2019/0238890 A1* | 8/2019 | Tsai | H04N 19/46 |
| 2021/0092426 A1* | 3/2021 | Choi | H04N 19/70 |
| 2021/0195223 A1* | 6/2021 | Chang | H04N 19/137 |
| 2021/0337228 A1* | 10/2021 | Wang | H04N 19/1883 |

FOREIGN PATENT DOCUMENTS

| | | |
|---|---|---|
| JP | 2021512534 A | 5/2021 |
| JP | 2022514513 A | 2/2022 |
| RU | 2641475 C2 | 1/2018 |
| WO | 2014047582 A1 | 3/2014 |
| WO | 2015004924 A1 | 1/2015 |
| WO | 2019145262 A1 | 8/2019 |
| WO | 2020185813 A1 | 9/2020 |

OTHER PUBLICATIONS

Chen et al, "Signaling subpicture coded video sequences", Mar. 2019, JVET of ITU-T SG 16 WP 3 and ISO/IEC JTC 1/SC 29/WG 11, vol. 1, 7 pages (Year: 2019).*

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Feb. 2018, 692 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Boyce, et al., "HEVC Additional Supplemental Enhancement Information (Draft 4)," Oct. 24, 2017, publically available herein: http://phenix.int-evry.fr/jct/doc_end_user/documents/29_Macau/wg11/JCTVC-AC1005-v2.zip, 56 pages.

Bross, et al., "Versatile Video Coding (Draft 6)," Joint Video Experts Team (JVET) of ITU-T SG 16 WP 3 and ISO/IEC JTC 1/SC 29/WG 11, Document JVET-O2001-vE, 15th Meeting: Gothenburg, SE, Jul. 3-12, 2019, 455 pages.

Chen, et al., "AHG17: [SYS-VVC] Signalling Subpicture Coded Video Sequence," Document JVET-N0073-V1, Joint Video Experts Team (JVET) of ITU-T SG 16 WP 3 and ISO/IEC JTC 1/SC 29/WG 11, 14th Meeting: Geneva, Switzerland, Mar. 19-27, 2019, 7 pages.

Hannuksela, et al, "AHG12: On Group of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, Document JVET-M0261, 11 pages.

Document: JVET-N0073-v1, Chen, L., et al., "AHG17: [SYS-VVC] Signalling subpicture coded video sequence," Joint Video Experts Team (JVET) of ITU-T SG 16 WP 3 and ISO/IEC JTC 1/SC 29/WG 11, 14th Meeting: Geneva, Switzerland, Mar. 19-27, 2019, 7 pages.

Document: JVET-O0141-v2, Wang, Y.K., et al., "AHG12: Subpicture based motion-constrained independent regions", Joint Video Experts Team (JVET) of ITU-T SG 16 WP 3 and ISO/IEC JTC 1/SC 29/WG 11,15th Meeting: Gothernburg, SE, Jul. 3-12, 2019, 3 pages.

Document: JVET-M0261, Hannuksela, M., et al., "AHG12: On grouping of tiles," Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.

Xu Xuejiao, Design and Implementation of H.265 Stream Analysis Software, Audio-visual Industry Radio and Television Technology, Apr. 2018, with an English Abstract, 12 pages.

Document: JVET-N0754-v12, Deshpande, S., "BoG Report on Coded Picture Regions", Joint Video Experts Team (JVET) of ITU-T SG 16 WP 3 and ISO/IEC JTC 1/SC 29/WG 11, 14th Meeting: Geneva, CH, Mar. 19-27, 2019, 28 pages.

Document: JVET-Q0412-v1, Chen, J., et al., "AHG9/AHG12: A syntax and semantics fix for subpicture ID mapping", Joint Video Experts Team (JVET) of ITU-T SG 16 WP 3 and ISO/IEC JTC 1/SC 29/WG 11, 17th Meeting: Brussels, BE, Jan. 7-17, 2020, 5 pages.

Document: JVET-O0555-v1, Boyce, J., et al., "Sub-pictures and sub-picture sets with level derivation," Joint Video Experts Team (JVET) of ITU-T SG 16 WP 3 and ISO/IEC JTC 1/SC 29/WG 11 15th Meeting: Gothenburg, SE, Jul. 3-12, 2019, 14 pages.

* cited by examiner

| 1 | 2 | 3 | 4 |
| 5 | 6 | 7 | 8 |
← 607

| 10 | 11 | 1 / 5 |
| 14 | 15 | 4 / 8 |

| 1 | 2 | 3 | 4 |
| 5 | 6 | 7 | 8 |
← 707

| 10 | 9 | 3 / 7 |
| 14 | 13 | 4 / 8 |

FIG. 7E

SIGNALING SUBPICTURE IDS IN SUBPICTURE BASED VIDEO CODING

CROSS-REFERENCE TO RELATED APPLICATIONS

This patent application is a continuation of International Application No. PCT/US2020/050835 filed on Sep. 15, 2020, by Futurewei Technologies, Inc., and titled "Signaling Subpicture IDs in Subpicture Based Video Coding," which claims the benefit of U.S. Provisional Patent Application No. 62/901,552, filed Sep. 17, 2019, by Futurewei Technologies, Inc., and titled "Signaling Subpicture IDs in Subpicture Based Video Coding," each of which is hereby incorporated by reference.

TECHNICAL FIELD

The present disclosure is generally related to video coding, and is specifically related to signaling of subpicture identifiers (IDs) in subpicture-based video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method implemented by a decoder, comprising receiving, by the decoder, a bitstream including a sequence parameter set (SPS), a picture parameter set (PPS), and a plurality of subpictures associated with a subpicture identifier (ID) mapping, wherein the SPS includes an SPS flag; determining, by the decoder, whether the SPS flag has a first value or a second value, wherein the SPS flag having the first value specifies that the subpicture ID mapping is signaled in the SPS, and wherein the SPS flag having the second value specifies that the subpicture ID mapping is signaled in the PPS; obtaining, by the decoder, the subpicture ID mapping from the SPS when the SPS flag has the first value and from the PPS when the SPS flag has the second value; and decoding, by the decoder, the plurality of subpictures using the subpicture ID mapping.

The method provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PPS includes a PPS flag, and the method further comprises determining, by the decoder, whether the PPS flag has the first value or the second value, wherein the PPS flag having the first value specifies that the subpicture ID mapping is signaled in the PPS, and wherein the PPS flag having the second value specifies that the subpicture ID mapping is not signaled in the PPS; and obtaining, by the decoder, the subpicture ID mapping from the PPS when the PPS flag has the first value.

Optionally, in any of the preceding aspects, another implementation of the aspect provides that the SPS flag has the first value when the PPS flag has the second value, and wherein the SPS flag has the second value when the PPS flag has the first value.

Optionally, in any of the preceding aspects, another implementation of the aspect provides that the first value is one and the second value is zero.

Optionally, in any of the preceding aspects, another implementation of the aspect provides that the SPS includes a second SPS flag, and wherein the second SPS flag specifies whether the subpicture ID mapping is explicitly signaled in the SPS or the PPS.

Optionally, in any of the preceding aspects, another implementation of the aspect provides that the bitstream further comprises a coded video sequence (CVS) change flag, and wherein the CVS change flag indicates whether the subpicture ID mapping is permitted to change within a coded video sequence (CVS) of the bitstream.

Optionally, in any of the preceding aspects, another implementation of the aspect provides that the bitstream comprises a merged bitstream, and wherein the subpicture ID mapping has changed within the CVS of the bitstream.

A second aspect relates to a method implemented by an encoder, the method comprising encoding, by the decoder, a bitstream including a sequence parameter set (SPS), a picture parameter set (PPS), and a plurality of subpictures associated with a subpicture identifier (ID) mapping, wherein the SPS includes an SPS flag; setting, by the decoder, the SPS flag to a first value when the subpicture ID mapping is signaled in the SPS and to a second value when the subpicture ID mapping is signaled in the PPS; and storing, by the decoder, the bitstream for communication toward a decoder.

The method provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the decoder, a PPS flag in the PPS to the first value when the subpicture ID mapping is signaled in the PPS and to the second value when the subpicture ID mapping is not signaled in the PPS.

Optionally, in any of the preceding aspects, another implementation of the aspect provides that the SPS flag has the first value when the PPS flag has the second value, and wherein the SPS flag has the second value when the PPS flag has the first value.

Optionally, in any of the preceding aspects, another implementation of the aspect provides that the first value is one and the second value is zero.

Optionally, in any of the preceding aspects, another implementation of the aspect provides that the SPS includes a second SPS flag, and wherein the second SPS flag specifies whether the subpicture mapping is explicitly signaled in the SPS or the PPS.

Optionally, in any of the preceding aspects, another implementation of the aspect provides that the bitstream further comprises a coded video sequence (CVS) change flag, and wherein the CVS change flag indicates whether the subpicture ID mapping may change within a coded video sequence (CVS) of the bitstream.

Optionally, in any of the preceding aspects, another implementation of the aspect provides that the bitstream comprises a merged bitstream, and wherein the subpicture ID mapping has changed within the CVS of the bitstream.

A third aspect relates to a decoding device, comprising a receiver configured to receive a video bitstream including a sequence parameter set (SPS), a picture parameter set (PPS), and a plurality of subpictures associated with a subpicture identifier (ID) mapping, wherein the SPS includes an SPS flag; a memory coupled to the receiver, the memory storing instructions; and a processor coupled to the memory, the processor configured to execute the instructions to cause the decoding device to determine whether the SPS flag has a first value or a second value, wherein the SPS flag having the first value specifies that the subpicture ID mapping is signaled in the SPS, and wherein the SPS flag having the second value specifies that the subpicture ID mapping is signaled in the PPS; obtain the subpicture ID mapping from the SPS when the SPS flag has the first value and from the PPS when the SPS flag has the second value; and decode the plurality of subpictures using the subpicture ID mapping.

The decoding device provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the SPS flag has the first value when the PPS flag has the second value, wherein the SPS flag has the second value when the PPS flag has the first value, and wherein the first value is one and the second value is zero.

Optionally, in any of the preceding aspects, another implementation of the aspect provides that the SPS includes a second SPS flag, and wherein the second SPS flag specifies whether the subpicture mapping is explicitly signaled in the SPS or the PPS.

Optionally, in any of the preceding aspects, another implementation of the aspect provides that the bitstream further comprises a coded video sequence (CVS) change flag, and wherein the CVS change flag indicates whether the subpicture ID mapping may change within a coded video sequence (CVS) of the bitstream.

Optionally, in any of the preceding aspects, another implementation of the aspect provides that the bitstream comprises a merged bitstream, and wherein the subpicture ID mapping has changed within the CVS of the bitstream.

A fourth aspect relates to an encoding device, comprising a memory containing instructions; a processor coupled to the memory, the processor configured to implement the instructions to cause the encoding device to encode a bitstream including a sequence parameter set (SPS), a picture parameter set (PPS), and a plurality of subpictures associated with a subpicture identifier (ID) mapping, wherein the SPS includes an SPS flag; set the SPS flag to a first value when the subpicture ID mapping is signaled in the SPS and to a second value when the subpicture ID mapping is signaled in the PPS; set a PPS flag in the PPS to the first value when the subpicture ID mapping is signaled in the PPS and to the second value when the subpicture ID mapping is not signaled in the PPS; and a transmitter coupled to the processor, the transmitter configured to transmit the bitstream toward a video decoder.

The encoding device provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the SPS flag has the first value when the PPS flag has the second value, and wherein the SPS flag has the second value when the PPS flag has the first value.

Optionally, in any of the preceding aspects, another implementation of the aspect provides that the first value is one and the second value is zero.

Optionally, in any of the preceding aspects, another implementation of the aspect provides that the bitstream further comprises a coded video sequence (CVS) change flag, and wherein the CVS change flag indicates whether the subpicture ID mapping may change within a coded video sequence (CVS) of the bitstream.

Optionally, in any of the preceding aspects, another implementation of the aspect provides that the PPS ID specifies a value of a second PPS ID for a PPS in use, and wherein the second PPS ID identifies the PPS for reference by the syntax elements.

Optionally, in any of the preceding aspects, another implementation of the aspect provides that the bitstream comprises a merged bitstream, and wherein the subpicture ID mapping has changed within the CVS of the bitstream.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that a display configured to display a decoded picture.

A sixth aspect relates to a system. The system includes an encoder; and a decoder in communication with the encoder, wherein the encoder or the decoder includes the decoding device, the encoding device, or the coding apparatus disclosed herein.

The system provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDS in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 6A-6E illustrate an example mechanism for creating an extractor track for combining sub-pictures of multiple resolutions from different bitstreams into a single picture for use in virtual reality (VR) applications.

FIGS. 7A-7E illustrate an example mechanism for updating the extractor track based on a change in viewing orientation in VR applications.

DETAILED DESCRIPTION

Figure 1:
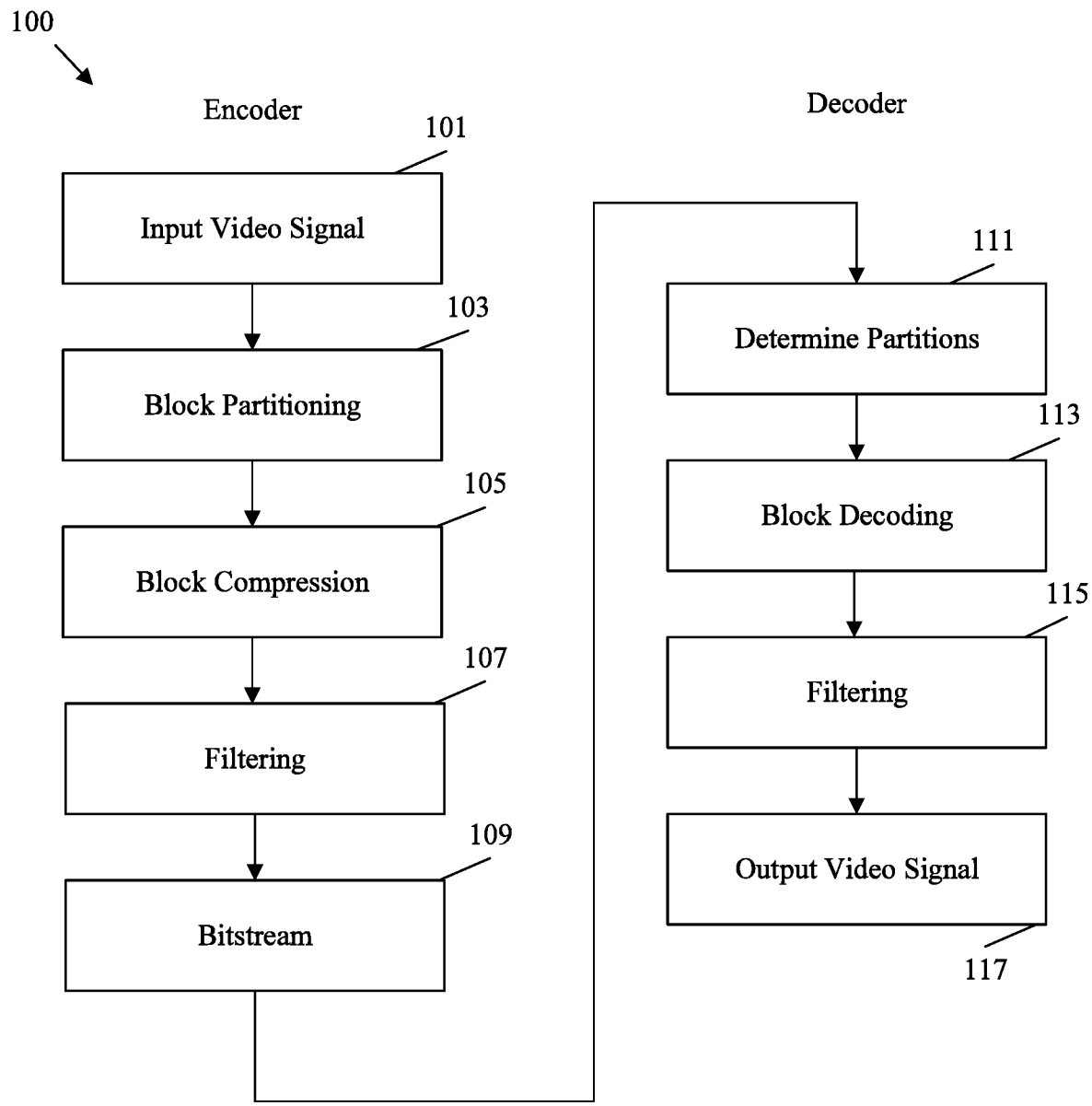
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A sequence parameter set (SPS) is a parameter set that contains data related to a sequence of pictures. A picture parameter set (PPS) is a syntax structure containing syntax elements that apply to zero or more entire coded pictures as determined by a syntax element found in each picture header.

A flag is a variable or single-bit syntax element that can take one of the two possible values: 0 and 1. A subpicture is a rectangular region of one or more slices within a picture. A subpicture identifier (ID) is a number, letter, or other indicia that uniquely identifies a subpicture. The subpicture IDs (a.k.a., tile identifiers) are used to identify particular subpictures using a subpicture index, which may be referred to herein as a subpicture ID mapping. Stated another way, subpicture ID mapping is a table that provides a one-to-one mapping between a list of subpicture indices and subpicture IDs. That is, a subpicture ID mapping provides a distinct subpicture ID for each subpicture.

An access unit (AU) is a set of one or more coded pictures associated with the same display time (e.g., the same picture order count) for output from a decoded picture buffer (DPB) (e.g., for display to a user). An access unit delimiter (AUD) is an indicator or data structure used to indicate the start of an AU or the boundary between AUs. A decoded video sequence is a sequence of pictures that have been reconstructed by a decoder in preparation for display to a user.

A CVS is a sequence of access units (AUs) that include, in decoding order, a coded video sequence start (CVSS) AU, followed by zero or more AUs that are not CVSS AUs, including all subsequent AUs up to but not including any subsequent AU that is a CVSS AU. A CVSS AU is an AU in which there is a prediction unit (PU) for each layer specified by the video parameter set (VPS) and the coded picture in each PU is a CLVSS picture. In an embodiment, each picture is within an AU. A PU is a set of Network Abstraction Layer (NAL) units that are associated with each other according to a specified classification rule, are consecutive in decoding order, and contain exactly one coded picture.

The following acronyms are used herein: Adaptive Loop Filter (ALF), Coding Tree Block (CTB), Coding Tree Unit (CTU), Coding Unit (CU), Coded Video Sequence (CVS), Decoded Picture Buffer (DPB), Instantaneous Decoding Refresh (IDR), Intra-Random Access Point (IRAP), Joint Video Experts Team (JVET), Least Significant Bit (LSB), Most Significant Bit (MSB), Motion-Constrained Tile Set (MCTS), Maximum Transfer Unit (MTU), Network Abstraction Layer (NAL), Picture Order Count (POC), Picture Parameter Set (PPS), Raw Byte Sequence Payload (RBSP), Sample Adaptive Offset (SAO), Sequence Parameter Set (SPS), Temporal Motion Vector Prediction (TMVP), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC).

HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slice based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is needed, regular slices can be used with WPP, with certain coding overhead.

Tiles define horizontal and vertical boundaries that partition a picture into tile columns and rows. The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included in individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases where a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publically available at: http://phenix. int-evry.fr/jct/doc_end_user/documents/29_Macau/wg11/JCTVC-AC1005-v2. zip. With this amendment included, HEVC specifies three MCTS-related supplemental enhancement information (SEI) messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement video parameter sets (VPSs), SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

In the latest VVC draft specification, a picture may be partitioned into multiple subpictures, each covering a rectangular region and containing an integer number of complete slices. The subpicture partitioning persists across all pictures within a coded video sequence (CVS), and the partitioning information (i.e., the subpicture positions and sizes) is signaled in the SPS. A subpicture may be indicated as being coded without using sample values from any other subpicture for motion compensation.

In JVET contribution JVET-O0141, which is publicly available at: http://phenix.it-sudparis.eu/jvet/doc_end_user/documents/13_Marrakech/wg11/JVET-M0261-v1.zip, the subpicture design is similar as in the latest VVC draft specification with some differences, one of which is the explicit signaling of a subpicture ID for each subpicture in the SPS as well as the signaling of the subpicture ID in each slice header to enable subpicture-based sub-bitstream extraction without the need to change coded slice NAL units. In this approach, the subpicture ID for each subpicture keeps unchanged across all pictures in a CVS.

During earlier discussions, it was mentioned that a different approach for signaling of subpicture IDs should be used to also enable subpicture-based sub-bitstream merging without the need for changing coded slice NAL units.

For example, and as will be more fully explained below, in viewport-dependent 360-degree video streaming, the client selects which subpictures are received and merged to the bitstream to be decoded. When the viewing orientation changes, some subpicture ID values may remain the same while other subpicture ID values are changed compared to subpicture ID values received prior to the viewing orientation change. Thus, the subpicture IDs that the decoder receives in the merged bitstream change when the viewing orientation changes.

One approach that has been considered is as follows.

Sub-picture positions and sizes are indicated in the SPS using, for example, the syntax in the latest VVC draft specification. Sub-picture indices are assigned (0 to N-1, where N is the number of sub-pictures). The mapping of subpicture ID to subpicture index resides in the PPS because that mapping might need to be changed in the middle of a CVS. This can be a loop i=0 to N-1, providing the subpicture_id[i] that maps to sub-picture index i. This subpicture ID mapping needs to be rewritten by the client when the client selects a new set of subpictures to be decoded. The slice header contains the subpicture ID (e.g., subpicture_id), which the encoder selected (and this does not need to be rewritten in sub-bitstream merging).

Unfortunately, there are problems with existing subpicture ID signaling approaches. Many application scenarios using subpicture-based video coding involve sub-bitstream extraction but not sub-bitstream merging. For example, each extracted sub-bitstream may be decoded by its own decoder instance. As such, there is no need to merge the extracted sub-bitstreams into one bitstream to be decoded by only one decoder instance. In these scenarios, the subpicture ID for each subpicture won't change within a CVS. Thus, the subpicture IDs can be signaled in the SPS. Signaling of such subpicture IDs in the SPS instead of the PPS is beneficial from both bits saving point of view and session negotiation point of view.

In application scenarios involving both sub-bitstream extraction and sub-bitstream merging, the subpicture IDs do not change within a CVS in the original bitstreams. Therefore, signaling of subpicture IDs in the SPS enables the use of the subpicture IDs in both the SPS and in the slice headers, which is useful for the sub-bitstream extraction part of the process. However, this approach is only feasible when the subpicture IDs do not change within the CVS in the original bitstream.

Disclosed herein are techniques that ensure efficient signaling of subpicture identifiers (IDs) even when the subpicture IDs change within the coded video sequence (CVS) in application scenarios involving both sub-bitstream extraction and sub-bitstream merging. The efficient signaling is accomplished by setting flags in the sequence parameter set (SPS) or the picture parameter set (SPS) to indicate whether subpicture IDs in the CVS may change and, if so, where the subpicture IDs are located. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
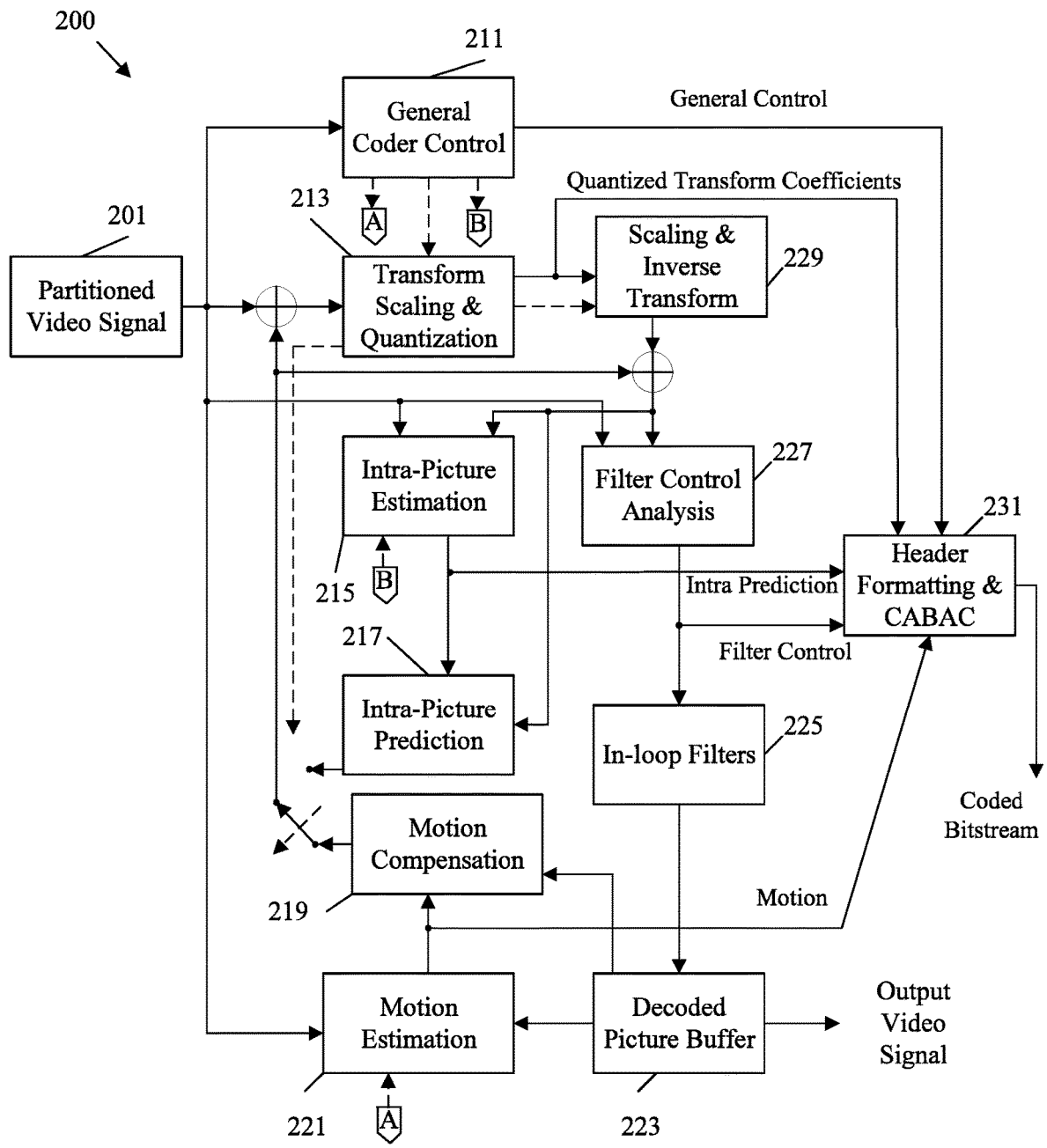
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
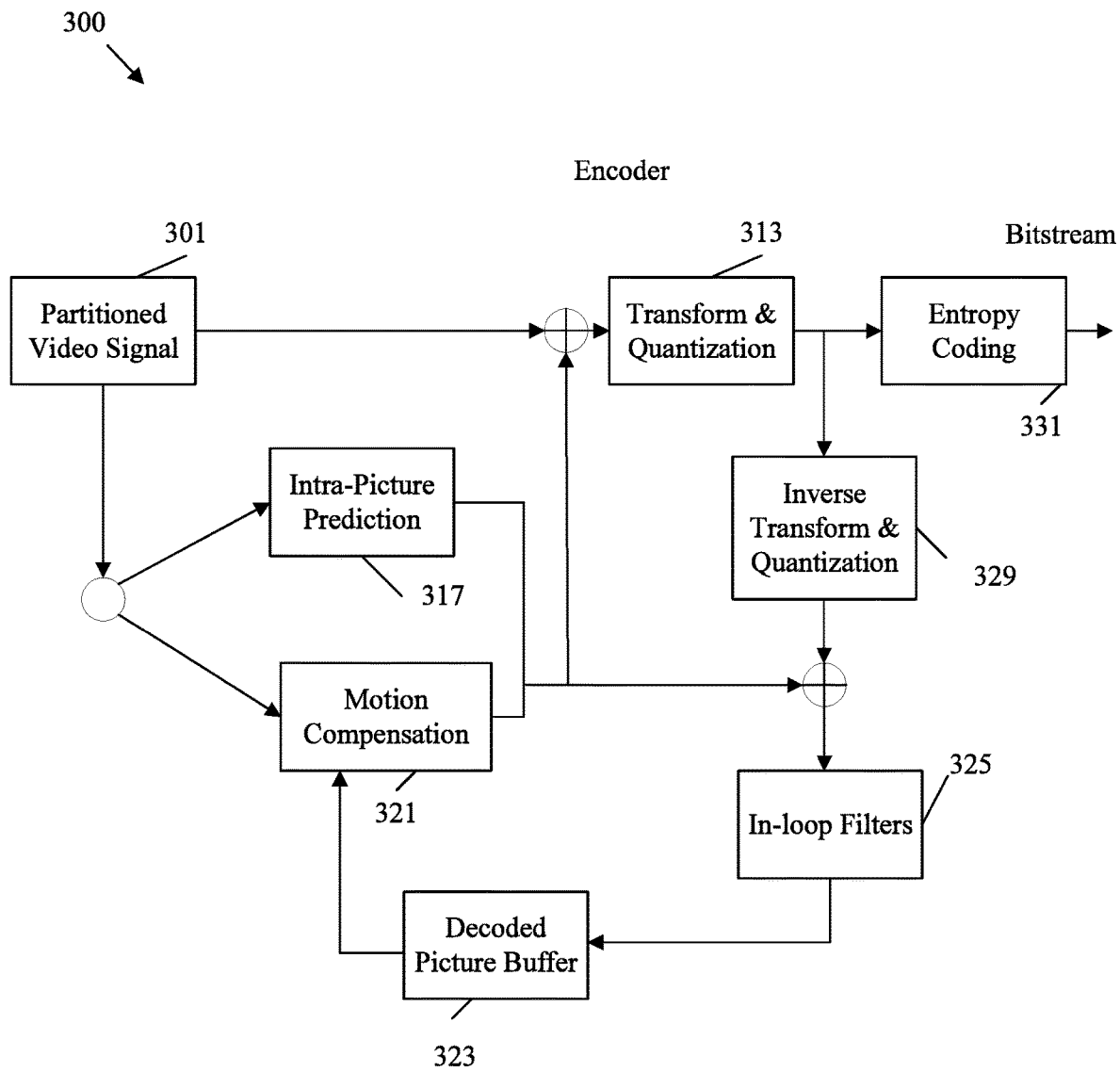
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
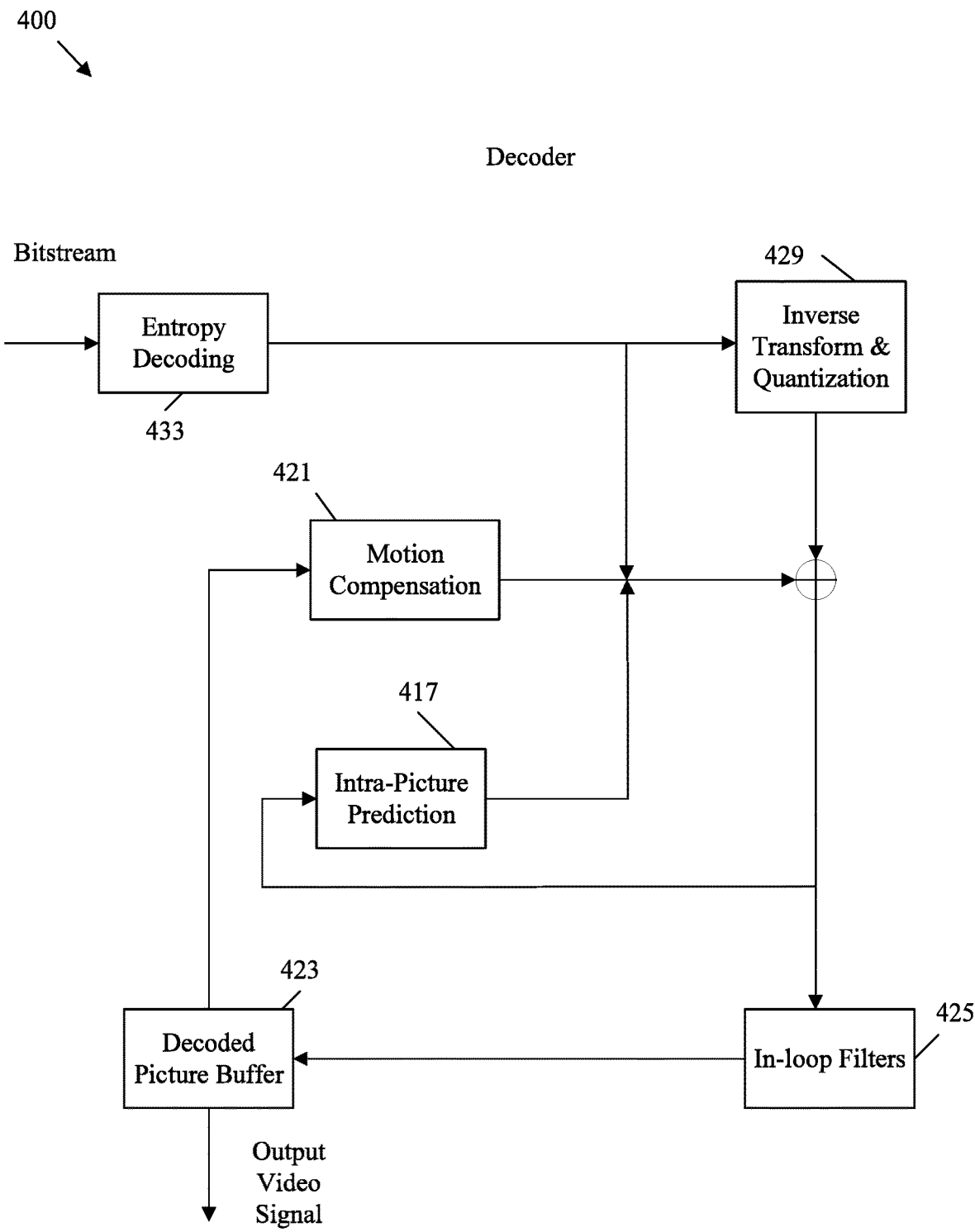
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
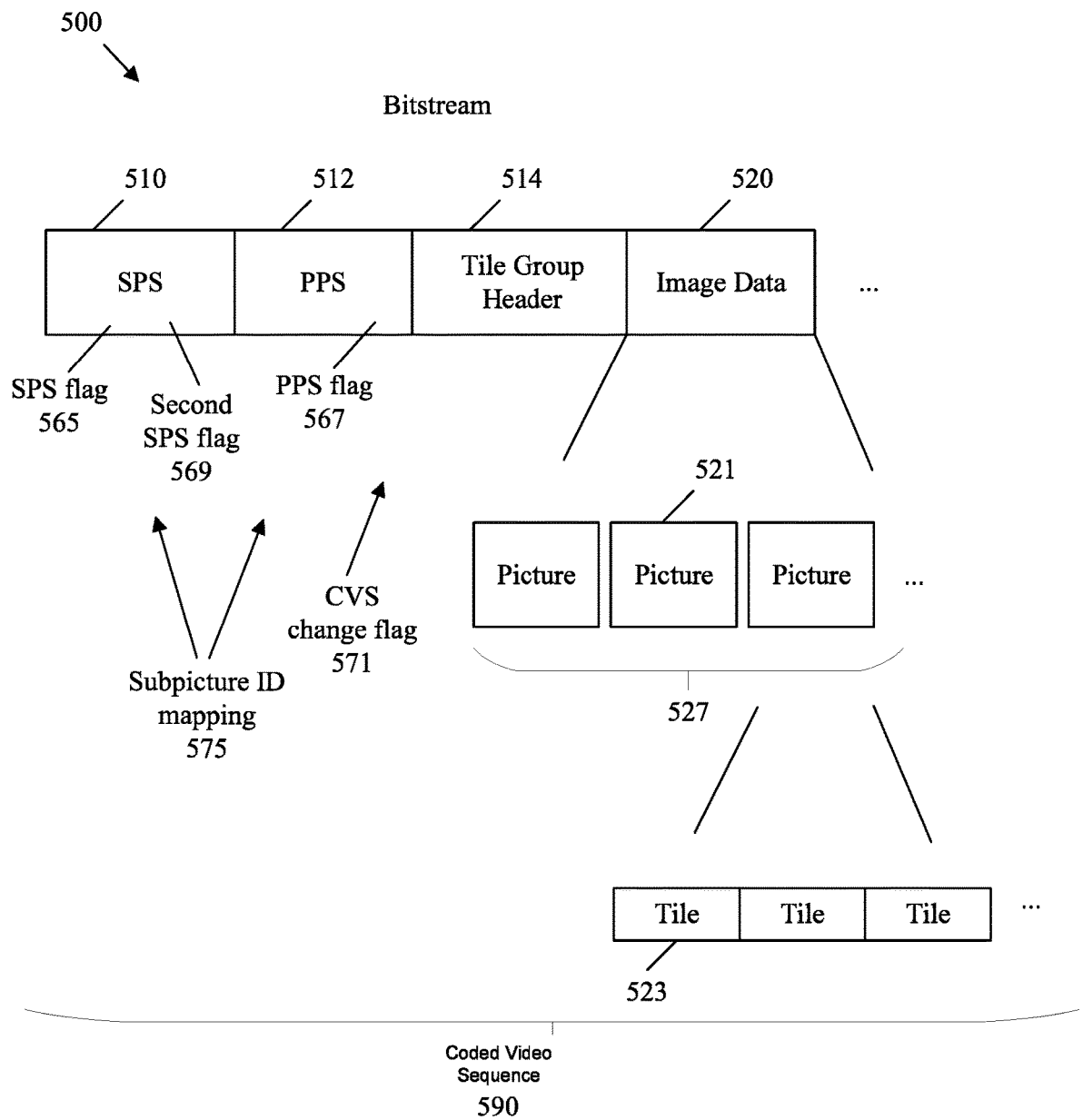
FIG. 5 is a schematic diagram illustrating an example bitstream containing an encoded video sequence.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, tile group headers 514, and image data 520. An SPS 510 contains sequence data common to all the pictures in the video sequence contained in the bitstream 500. Such data can include picture sizing, bit depth, coding tool parameters, bit rate restrictions, etc. In an embodiment, the SPS 510 includes an SPS flag 565. In an embodiment, the SPS flag 565 has a first value (e.g., one) or a second value (e.g., zero). The SPS flag 565 having the first value specifies that a subpicture ID mapping 575 is signaled in the SPS 510, and the SPS flag 565 having the second value specifies that the subpicture ID mapping 575 is signaled in the PPS 512.

The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. In an embodiment, the PPS 512 includes an PPS flag 567. In an embodiment, the PPS flag 567 has a first value (e.g., one) or a second value (e.g., zero). The PPS flag 567 having the first value specifies that the subpicture ID mapping 575 is signaled in the PPS 512, and the PPS flag 567 having the second value specifies that the subpicture ID mapping 575 is not signaled in the PPS 512.

The tile group header 514 contains parameters that are specific to each tile group in a picture. Hence, there may be one tile group header 514 per tile group in the video sequence. The tile group header 514 may contain tile group information, picture order counts (POCs), reference picture lists, prediction weights, tile entry points, deblocking parameters, etc. It should be noted that some systems refer to the tile group header 514 as a slice header, and use such information to support slices instead of tile groups.

The image data 520 contains video data encoded according to inter-prediction and/or intra-prediction as well as corresponding transformed and quantized residual data. Such image data 520 is sorted according to the partitioning used to partition the image prior to encoding. For example, the image in the image data 520 includes one or more pictures 521. The sequence or series of pictures 527 may be referred to as a CVS 527. As used herein, the CVS 527 is a sequence of access units (AUs) that include, in decoding order, a coded video sequence start (CVSS) AU, followed by zero or more AUs that are not CVSS AUs, including all subsequent AUs up to but not including any subsequent AU that is a CVSS AU. A CVSS AU is an AU in which there is a prediction unit (PU) for each layer specified by the video parameter set (VPS) and the coded picture in each PU is a CLVSS picture. In an embodiment, each picture 521 is within an AU. A PU is a set of NAL units that are associated with each other according to a specified classification rule, are consecutive in decoding order, and contain exactly one coded picture.

The CVS is a coded video sequence for every coded layer video sequence (CLVS) in the video bitstream. Notably, the CVS and the CLVS are the same when the video bitstream includes a single layer. The CVS and the CLVS are only different when the video bitstream includes multiple layers.

Each of the pictures 521 may be divided into tiles 523. A tile 523 is a partitioned portion of a picture created by horizontal and vertical boundaries. Tiles 523 may be rectangular and/or square. Specifically, a tile 523 includes four sides that are connected at right angles. The four sides include two pair of parallel sides. Further, the sides in a parallel side pair are of equal length. As such, a tile 523 may be any rectangular shape, where a square is a special case of a rectangle where all four sides are of equal length. An image/picture can contain one or more tiles 523.

A picture (e.g., picture 521) may be petitioned into rows and columns of tiles 523. A tile row is a set of tiles 523 positioned in a horizontally adjacent manner to create a continuous line from the left boundary to the right boundary of a picture (or vice versa). A tile column is a set of tiles 523 positioned in a vertically adjacent manner to create a continuous line from the top boundary to the bottom boundary of the picture (or vice versa).

Tiles 523 may or may not allow prediction based on other tiles 523, depending on the example. Each tile 523 may have a unique tile index in the picture. A tile index is a procedurally selected numerical identifier that can be used to distinguish one tile 523 from another. For example, tile indices may increase numerically in raster scan order. Raster scan order is left to right and top to bottom.

It should be noted that, in some examples, tiles 523 may also be assigned tile identifiers (IDs). A tile ID is an assigned identifier that can be used to distinguish one tile 523 from another. Computations may employ tile IDs instead of tile indices in some examples. Further, tile IDs can be assigned to have the same values as the tile indices in some examples. Tile indices and/or IDs may be signaled to indicate tile groups containing the tiles 523. For example, the tile indices and/or IDs may be employed to map picture data associated with a tile 523 to a proper position for display. A tile group is a related set of tiles 523 that can be separately extracted and coded, for example to support display of a region of interest and/or to support parallel processing. Tiles 523 in a tile group can be coded without reference to tiles 523 outside of the tile group. Each tile 523 may be assigned to a corresponding tile group, and therefore a picture can contain a plurality of tile groups.

The tiles 523 are further divided into coding tree units (CTUs). The CTUs are further divided into coding blocks based on coding trees. The coding blocks can then be encoded/decoded according to prediction mechanisms.

FIGS. 6A-6E illustrate an example mechanism 600 for creating an extractor track 610 (a.k.a., a merged bitstream) for combining sub-pictures of multiple resolutions from different bitstreams into a single picture for use in virtual reality (VR) applications. Mechanism 600 may be employed to support an example use case of method 100. For example, mechanism 600 can be employed to generate a bitstream 500 for transmission from a codec system 200 and/or an encoder 300 toward a codec system 200 and/or a decoder 400. As a specific example, mechanism 600 can be employed for use in conjunction with VR, Ominidirectional Media Format (OMAF), three hundred sixty degree video, etc.

In VR, only a portion of video is displayed to a user. For example, VR video may be filmed to include a sphere surrounding a user. The user may employ a head mounted display (HMD) to view the VR video. The user may point the HMD toward a region of interest. The region of interest is displayed to the user and other video data is discarded. In this way, a user views only a user selected portion of the VR video at any instant. This approach mimics the user's perceptions, and hence causes the user to experience a virtual environment in a manner that mimics a real environment. One of the issues with this approach is that the entire VR video may be transmitted to the user, but only a current viewport of the video is actually used and the remainder is discarded. In order to increase signaling efficiency for streaming applications, the user's current viewport can be transmitted at a higher first resolution and other viewports can be transmitted at a lower second resolution. In this way, the viewports that are likely to be discarded take up less bandwidth than the viewport(s) likely to be viewed by the user. In the event the user selects a new viewport, the lower resolution content can be shown until the decoder can request that a different current viewport be transmitted at the higher first resolution. Mechanism 600 can be employed to create an extractor track 610, as shown in FIG. 6E, to support this functionality. An extractor track 610 is a track of image data that encapsulates a picture (e.g., picture 521) at multiple resolutions for use as described above.

The mechanism 600 encodes the same video content at a first resolution 611 and a second resolution 612, as shown in FIGS. 6A and 6B, respectively. As a specific example, the first resolution 611 may be 5120×2560 luma samples and the second resolution 612 may be 2560×1280 luma samples. The pictures of the video may be partitioned into tiles 601 at the first resolution 611 and tiles 603 at the second resolution 612, respectively. As used herein, the tiles may be referred to as subpictures. In the example shown, the tiles 601 and 603 are each partitioned into a 4×2 grid. Further, an MCTS can be coded for each tile 601 and 603 position. The pictures at the first resolution 611 and the second resolution 612 each result in an MCTS sequence describing video over time at a corresponding resolution. Each coded MCTS sequence is stored as a sub-picture track or a tile track. Mechanism 600 can then use the pictures to create segments to support viewport adaptive MCTS selection. For example, each range of viewing orientations that causes a different selection of high- and low-resolution MCTSs is considered. In the illustrated example, four tiles 601 containing MCTSs at the first resolution 611 and four tiles 603 containing MCTSs at the second resolution 612 are obtained.

Mechanism 600 can then create an extractor track 610 for each possible viewport-adaptive MCTS selection. FIGS. 6C and 6D illustrate an example viewport-adaptive MCTS selection. Specifically, a set of selected tiles 605 and 607 are selected at the first resolution 611 and the second resolution 612, respectively. The selected tiles 605 and 607 are illustrated in gray shading. In the example shown, the selected tiles 605 are the tiles 601 at the first resolution 611 that are to be shown to the user and the selected tiles 607 are the tiles 603 at the second resolution 612 that are likely to be discarded but maintained to support display in the event the user selects a new viewport. The selected tiles 605 and 607 are then combined into a single picture containing image data at both the first resolution 611 and the second resolution 612. Such pictures are combined to create an extractor track 610. FIG. 6E illustrates a single picture from a corresponding extractor track 610 for purpose of illustration. As shown, the picture in the extractor track 610 contains the selected tiles 605 and 607 from the first resolution 611 and second resolution 612. As noted above, FIGS. 6C-6E illustrate a single viewport-adaptive MCTS selection. In order to allow for user selection of any viewport, an extractor track 610 should be created for each possible combination of selected tiles 605 and 607.

In the example shown, each selection of tiles 603 encapsulating content from the second resolution 612 bitstream contains two slices. A RegionWisePackingBox may be included in the extractor track 610 to create a mapping between the packed picture and a projected picture of the equirectangular projection (ERP) format. In the presented example, the bitstreams resolved from the extractor tracks 610 have resolution 3200×2560. Consequently, a four thousand sample (4K)-capable decoder may decode content where the viewport is extracted from a coded bitstream with five thousand sample 5K (5120×2560) resolution.

As shown in FIG. 6C, the selected tiles 605 (shown in gray) at the first resolution 611 have the following tile identifiers: 10, 11, 14 and 15. As used herein, the tile identifiers may also be referred to as subpicture identifiers. The selected tiles 607 at the second resolution 612 have the following identifiers: 1, 5, 4, and 8. Thus, the extractor track 610 contains the following tile identifiers: 10, 11, 14, 15, 1, 5, 4, and 8. The tile identifiers are used to identify particular subpictures using a subpicture index, which may be referred to herein as subpicture ID mapping.

FIGS. 7A-7E illustrate an example mechanism 700 for creating an extractor track 710 for combining sub-pictures of multiple resolutions from different bitstreams into a single picture for use in VR applications when the user has changed viewports relative to the viewport that was chosen for FIGS. 6A-6E. That is, FIGS. 7A-7E illustrate how a new extractor track 710 is created when there is a change in viewing orientation within the CVS, which includes the extractor track 610 and the extractor track 710.

As shown in FIGS. 7A-7B, the pictures of the video have been partitioned into tiles 701 at the first resolution 711 and tiles 703 at the second resolution 712, respectively. However, there has been a change in viewing orientation in the mechanism 700 relative to the mechanism 600. Therefore, as shown in FIGS. 7C-7D, the selected tiles 705 (shown in gray) at the first resolution 711 now have the following tile identifiers: 9, 10, 13, and 14, and the selected tiles 707 at the second resolution 712 now have the following identifiers: 3, 4, 7, and 8. Thus, the extractor track 710 contains the following tile identifiers: 3, 4, 7, 8, 9, 10, 13, and 14 due to the change in viewing orientation.

When a CVS being transmitted includes a constant set of sub-pictures, then the relevant sub-picture IDs are left in the SPS (all others are removed). When a merging occurs (e.g., to form one of the extractor tracks 610 or 710), the subpicture IDs are moved to the PPS. In either case, the flag is set in the bitstream to indicate where the sub-pic IDs are currently located.

Normally, when the change in viewing orientation occurs, new IRAP pictures have to be sent. An IRAP picture is a coded picture for which all VCL NAL units have the same value of NAL unit type. An IRAP picture provides the following two important functionalities/benefits. Firstly, the presence of an IRAP picture indicates that the decoding process can start from that picture. This functionality allows a random access feature in which the decoding process starts at that position in the bitstream, not necessarily the beginning of the bitstream, as long as an IRAP picture is present at that position. Secondly, the presence of an IRAP picture refreshes the decoding process such that a coded picture starting at the IRAP picture, excluding random access skipped leading (RASL) pictures, are coded without any reference to previous pictures. Having an TRAP picture present in the bitstream consequently would stop any error that may happen during decoding of coded pictures prior to the IRAP picture to propagate to the IRAP picture and those pictures that follow the IRAP picture in decoding order.

While IRAP pictures provide important functionalities, they come with a penalty to the compression efficiency. The presence of an IRAP picture causes a surge in bitrate. This penalty to the compression efficiency is due to two reasons. Firstly, as an IRAP picture is an intra-predicted picture, the picture itself would require relatively more bits to represent when compared to other pictures (e.g., leading pictures, trailing pictures) that are inter-predicted pictures. Secondly, because the presence of an IRAP picture breaks temporal prediction (this is because the decoder would refresh the decoding process, in which one of the actions of the decoding process for this is to remove previous reference pictures in the decoded picture buffer (DPB)), the IRAP picture causes the coding of pictures that follow the IRAP picture in decoding order to be less efficient (i.e., needs more bits to represent) because they have less reference pictures for their inter-prediction coding.

In an embodiment, the IRAP picture is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures. For VVC, during the 12th JVET meeting in October 2018, it was agreed to have both IDR and CRA pictures as TRAP pictures. In an embodiment, Broken Link Access (BLA) and Gradual Decoder Refresh (GDR) pictures may also be considered to be IRAP pictures. The decoding process for a coded video sequence always starts at an TRAP picture.

In contrast to sending new TRAP pictures as described above, a better approach is to continue sending any tiles (a.k.a., subpictures) shared between the extractor track 610 and extractor track 710. That is, continue to send the tiles having the following tile IDs: 4, 8, 10, and 14 since those tiles are in both extractor track 610 and extractor track 710. In doing so, new IRAP pictures need only be sent for those tiles in extractor track 710 that were not also in extractor track 610. That is, new IRAP pictures need only be sent for tiles having the following tile IDs: 1, 5, 9, and 13 when the viewing orientation has changed. However, the change in the sub-picture IDs within the CVS may cause problems in signaling.

In order to resolve at least the signaling problem, an indication (e.g., a flag) is signaled in the bitstream to indicate whether the tile ID (a.k.a., the subpicture ID) for each tile (a. k. a, subpicture) may change within the CVS. Such a flag may be signaled in the SPS or in the PPS. In addition to signaling whether the tile ID may change within the CVS, the flag may also provide other functionality.

In one approach, the subpicture IDs are signaled either in the SPS syntax (when it is indicated that the subpicture ID for each subpicture does not change within a CVS) or the PPS syntax (when it is indicated that the subpicture ID for each subpicture may change within a CVS). In an embodiment, the subpicture IDs are never signaled in both the SPS syntax and the PPS syntax.

In another approach, the subpicture IDs are always signaled in the SPS syntax, and when the flag indicates that the subpicture ID for each subpicture may change within a CVS, the subpicture ID values signaled in the SPS may be overridden by the subpicture IDs signaled in the PPS syntax.

In yet another approach, the subpicture IDs are not signaled in the SPS syntax but only in the PPS syntax, and the indication of whether the subpicture ID for each subpicture may change within a CVS is also only signaled in the PPS syntax.

In this approach, other subpicture information, such as the position and size of each subpicture, the length of subpicture IDs in bits, as well as the flags subpic_treated_as_pic_flag[i] and loop_filter_across_subpic_enabled_flag[i] as in the latest VVC draft specification, may also signaled in the PPS instead of in the SPS, but all are the same for all PPSs referenced by coded pictures within the CVS.

When subpicture positions and sizes are signaled in the PPS, instead of being signaled similarly as in the latest VVC draft specification, they can be signaled based on the slices included in each subpicture. For example, for each subpicture, the slice index or ID of the slice located at the top-left corner of the subpicture and the slice index or ID or the slice located at the bottom-right corner of the subpicture can be signaled, for derivation of the subpicture position and size, wherein the signaling can be delta based, and in some particular occasions the signaling of the slice index or ID or its delta may be avoided and the value is inferred, e.g., similarly as the way the top-left and bottom-right brick indices are signaled for rectangular slices in the latest VVC draft specification.

In this embodiment, the subpicture IDs are signaled as follows.

In the SPS syntax, when it is indicated that the number of subpictures in each picture in the CVS is greater than 1, the following applies.

A flag (e.g., designated subpicture_ids_signalled_in_sps_flag or sps_subpic_id_mapping_present_flag) is signaled in the SPS. In an embodiment, the flag has the following semantics: subpicture_ids_signalled_in_sps_flag equal to 1 specifies that subpicture IDs are signaled in the SPS, one for each subpicture, and that the subpicture ID value for each particular subpicture does not change within the CVS. The subpicture_ids_signalled_in_sps_flag equal to 0 specifies that subpicture IDs are not signaled in the SPS but are instead signaled in the PPS, and the subpicture ID value for each particular subpicture may change within the CVS. When subpicture_ids_signalled_in_sps_flag is equal to 1, a subpicture ID is signaled for each subpicture in the SPS.

In the PPS syntax, a flag (e.g., designated subpicture_ids_signalled_in_pps_flag or pps_subpic_id_mapping_present_flag) is signaled in the PPS. The flag has the following semantics: subpicture_ids_signalled_in_pps_flag equal to 1 specifies that subpicture IDs are signaled in the PPS, one for each subpicture, and the subpicture ID value for each particular subpicture may change within the CVS. The subpicture_ids_signalled_in_pps_flag equal to 0 specifies that subpicture IDs are not signaled in the PPS but are instead signaled in the SPS, and the subpicture ID value for each particular subpicture does not change within the CVS.

In an embodiment, the value of subpicture_ids_signalled_in_pps_flag shall be equal to 1−subpicture_ids_signalled_in_sps_flag. When subpicture_ids_signalled_in_pps_flag is equal to 1, a subpicture ID is signaled for each subpicture in the PPS.

In the slice header syntax, a subpicture ID is signaled regardless of the number of subpictures specified by the referenced SPS.

Alternatively, when the number of subpictures in each picture is greater than 1, the SPS syntax always includes the subpicture IDs, one for each subpicture, and the SPS syntax also includes a flag specifying whether the subpicture IDs may be overridden by the subpicture IDs signaled in the PPS syntax and whether the subpicture ID value for each particular subpicture may change within the CVS. The overriding of the subpicture IDs can be performed either always for all of the subpicture IDs, or only for a selected subset of all the subpicture IDs.

Figure 8:
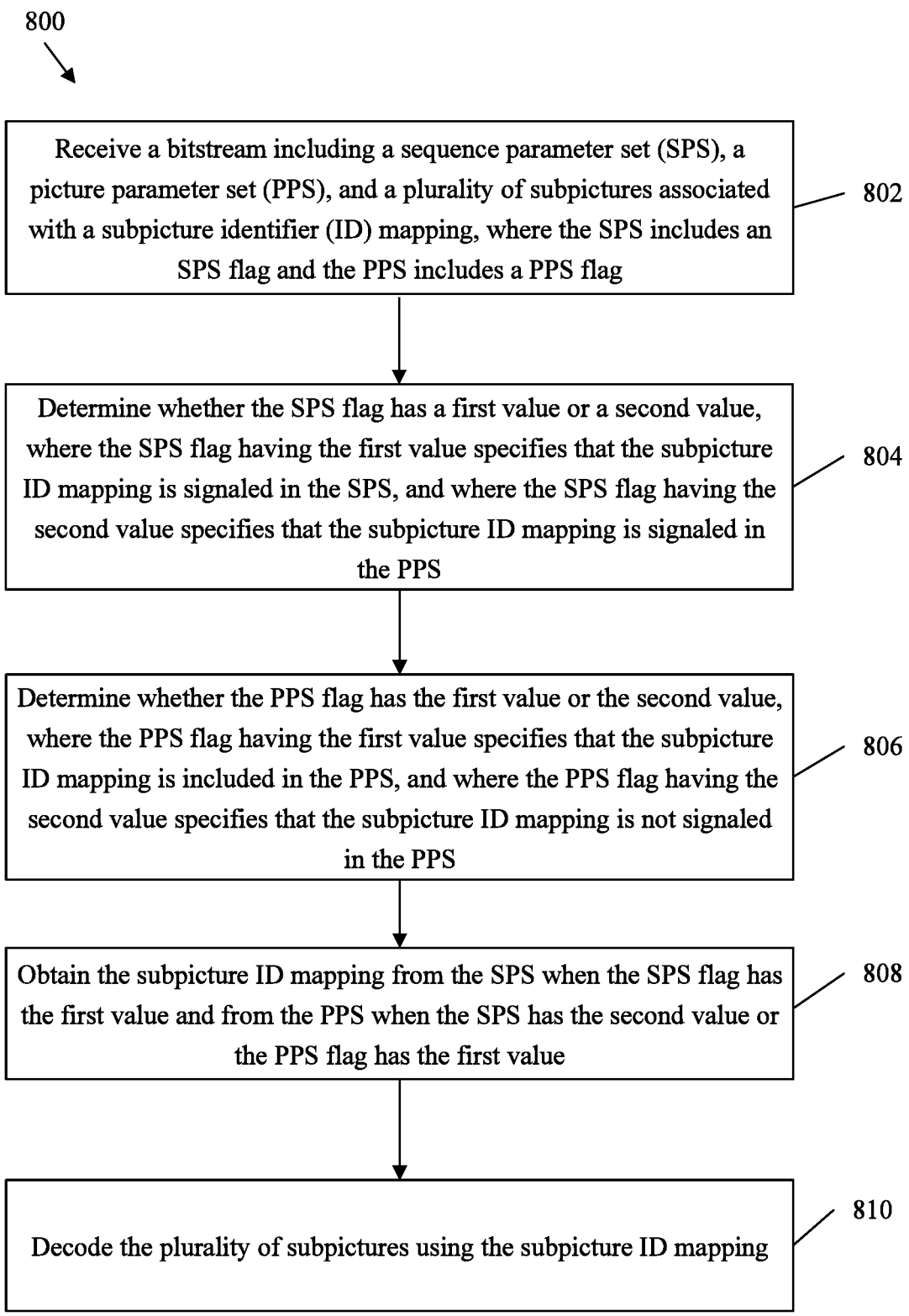
FIG. 8 is an embodiment of a method of decoding a coded video bitstream.

FIG. 8 is an embodiment of a method 800 of decoding implemented by a video decoder (e.g., video decoder 400). The method 800 may be performed after the decoded bitstream has been directly or indirectly received from a video encoder (e.g., video encoder 300). The method 800 improves the decoding process by ensuring efficient signaling of subpicture IDs even when the subpicture IDs change within the CVS in application scenarios involving both sub-bitstream extraction and sub-bitstream merging. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

In block 802, the video decoder receives a video bitstream (e.g., bitstream 500) including an SPS (e.g., SPS 510), a PPS (e.g., PPS 512), and a plurality of subpictures (e.g., tiles 605 and 607) associated with a subpicture identifier (ID) mapping 575. As noted above, subpicture ID mapping 575 is a mapping of subpicture IDs to particular subpictures by way of a subpicture index (e.g., subpicture ID 8 corresponds to subpicture index 8, which identifies a particular subpicture from the plurality of subpictures). In an embodiment, the SPS 510 contains an SPS flag 565. In an embodiment, the PPS 512 contains a PPS flag 567.

In block 804, the video decoder determines whether the SPS flag 565 has a first value or a second value. The SPS flag 565 having the first value specifies that the subpicture ID mapping 575 is included in the SPS 510, and the SPS flag 565 having the second value specifies that the subpicture ID mapping 575 is signaled in the PPS 512.

When the SPS flag 565 has the second value, in block 806, the video decoder determines whether the PPS flag 567 has the first value or the second value. The PPS flag 567 having the first value specifies that the subpicture ID mapping 575 is included in the PPS 512, and the PPS flag 567 having the second value specifies that the subpicture ID mapping 575 is not signaled in the PPS 512.

In an embodiment, the SPS flag 656 has the first value when the PPS flag 567 has the second value. In an embodiment, the SPS flag 565 has the second value when the PPS flag 567 has the first value. In an embodiment, the first value is one and the second value is zero.

In an embodiment, the SPS 510 contains a second SPS flag 569. The second SPS flag 569 specifies whether the subpicture mapping 575 is explicitly signaled in the SPS 510 or the PPS 512. In an embodiment, the bitstream 500 further comprises a CVS change flag 571. The CVS change flag 571 indicates whether the subpicture ID mapping 575 may change within the CVS 590 of the bitstream 500. In an embodiment, the CVS change flag 571 is included in the SPS 510, the PPS 512, or another parameter set or header in the bitstream 500.

In block 808, the video decoder obtains the subpicture ID mapping 575 from the SPS 510 when the SPS flag 565 has the first value and from the PPS 512 when the SPS has the second value and/or when the PPS flag 567 has the first value. In an embodiment, the bitstream comprises a merged bitstream. In an embodiment, the subpicture ID mapping 575 has changed within the CVS 590 of the bitstream 500.

In block 810, the video decoder decodes the plurality of subpictures using the subpicture ID mapping 575. Once decoded, the plurality of subpictures may be used to generate or produce an image or video sequence for display to a user on the display or screen of an electronic device (e.g., a smart phone, tablet, laptop, personal computer, etc.).

Figure 9:
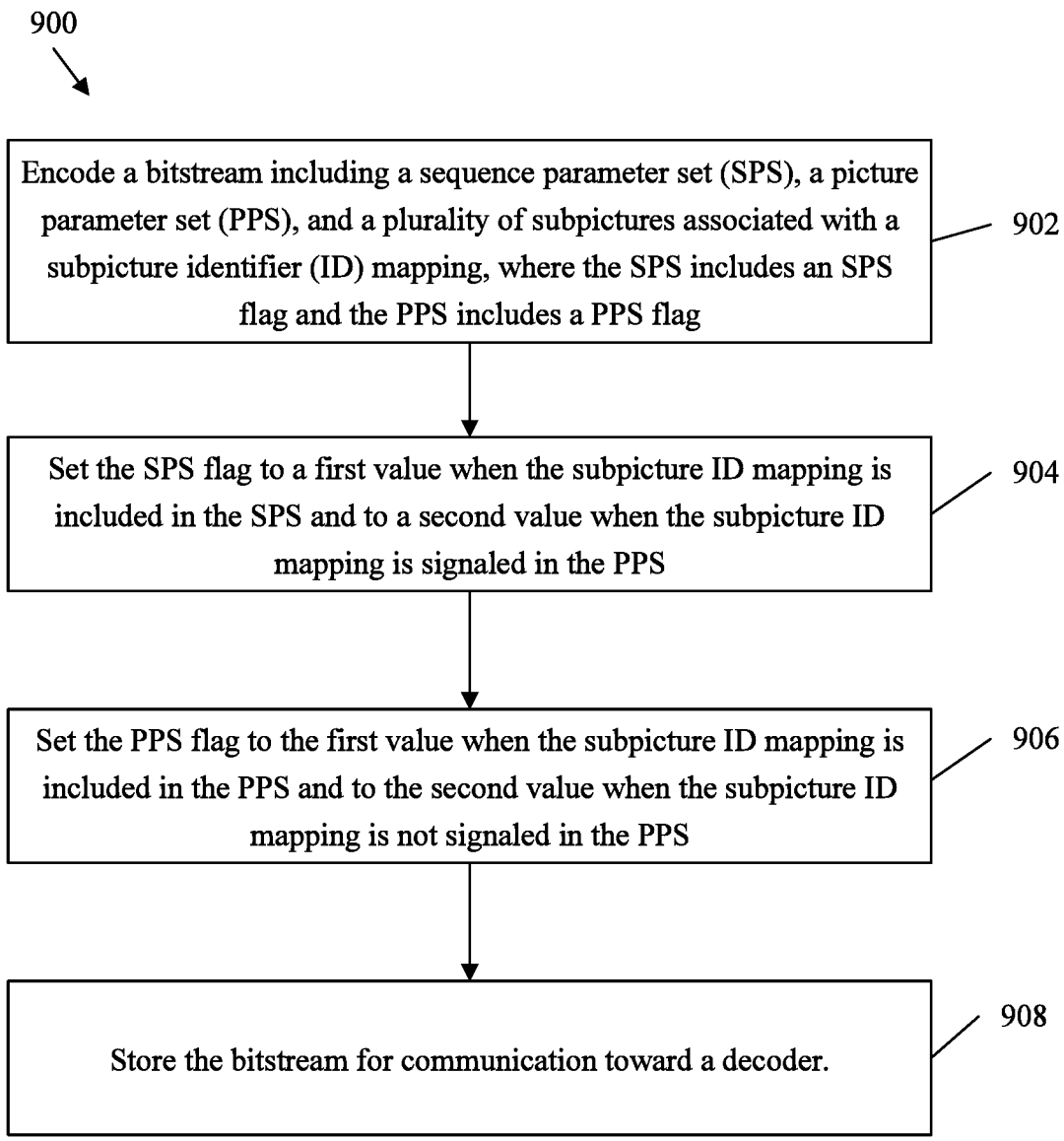
FIG. 9 is an embodiment of a method of encoding a coded video bitstream.

FIG. 9 is an embodiment of a method 900 of encoding a video bitstream implemented by a video encoder (e.g., video encoder 300). The method 900 may be performed when a picture (e.g., from a video) is to be encoded into a video bitstream and then transmitted toward a video decoder (e.g., video decoder 400). The method 900 improves the encoding process by ensuring efficient signaling of subpicture IDs even when the subpicture IDs change within the CVS in application scenarios involving both sub-bitstream extraction and sub-bitstream merging. This reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

In block 902, the video encoder encodes a bitstream including an SPS (e.g., SPS 510), a PPS (e.g., PPS 512), and a plurality of subpictures (e.g., tiles 605 and 607) associated with a subpicture identifier (ID) mapping. As noted above, subpicture ID mapping 575 is a mapping of subpicture IDs to particular subpictures by way of a subpicture index (e.g., subpicture ID 8 corresponds to subpicture index 8, which identifies a particular subpicture from the plurality of subpictures). In an embodiment, the SPS 510 contains an SPS flag 565 and the PPS 512 contains a PPS flag 567.

In block 904, the video encoder sets the SPS flag 565 to a first value when the subpicture ID mapping 575 is included in the SPS 510 and to a second value when the subpicture ID mapping 575 is signaled in the PPS 512.

In block 906, the video encoder sets the PPS flag 567 to the first value when the subpicture ID mapping 575 is included in the PPS 512 and to the second value when the subpicture ID mapping 575 is not signaled in the PPS 512.

In an embodiment, the SPS flag 565 has the first value when the PPS flag 567 has the second value. In an embodiment, the SPS flag 565 has the second value when the PPS flag 567 has the first value. In an embodiment, the first value is one and the second value is zero.

In an embodiment, the SPS 510 contains a second SPS flag 569. The second SPS flag 569 specifies whether the subpicture ID mapping 575 is explicitly signaled in the SPS 510 or the PPS 512. In an embodiment, the bitstream 500 further comprises a CVS change flag 571. The CVS change flag 571 indicates whether the subpicture ID mapping 575 may change within the CVS 590 of the bitstream 500. In an embodiment, the CVS change flag 571 is included in the SPS 510, the PPS 512, or another parameter set or header in the bitstream 500.

In block 908, the video encoder stores the bitstream for communication toward a decoder. The bitstream may be stored in memory until the video bitstream is transmitted toward the video decoder. Once received by the video decoder, the encoded video bitstream may be decoded (e.g., as described above) to generate or produce an image or video sequence for display to a user on the display or screen of an electronic device (e.g., a smart phone, tablet, laptop, personal computer, etc.).

In an embodiment, the subpicture IDs are signaled as follows.

The SPS syntax does not include signaling of subpicture IDs.

In the PPS syntax, a value indicting the number of subpictures is signaled, which is required to be the same for all PPSs referenced by coded pictures within the CVS, and when the indicated number of subpictures is greater than 1, the following applies:

A flag, e.g., named subpicture_id_unchanging_in_cvs_flag, is signalled in the PPS, with the following semantics: subpicture_id_unchanging_in_cvs_flag equal to 1 specifies that the subpicture ID for each particular subpicture signaled in the PPS does not change within the CVS. subpicture_id_unchanging_in_cvs_flag equal to 0 specifies that the subpicture ID for each particular subpicture signalled in the PPS may change within the CVS.

A value indicting the number of subpictures is signaled in the PPS. The indicated number of subpictures shall be the same for all PPSs referenced by coded pictures within a CVS.

A subpicture ID is signalled for each subpicture in the PPS. When subpicture_id_unchanging_in_cvs_flag equal to 1, the subpicture ID for each particular subpicture shall be the same for all PPSs referenced by coded pictures within the CVS.

In the slice header syntax, a subpicture ID is signaled, regardless of the number of subpictures specified by the referenced SPS.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Figure 10:
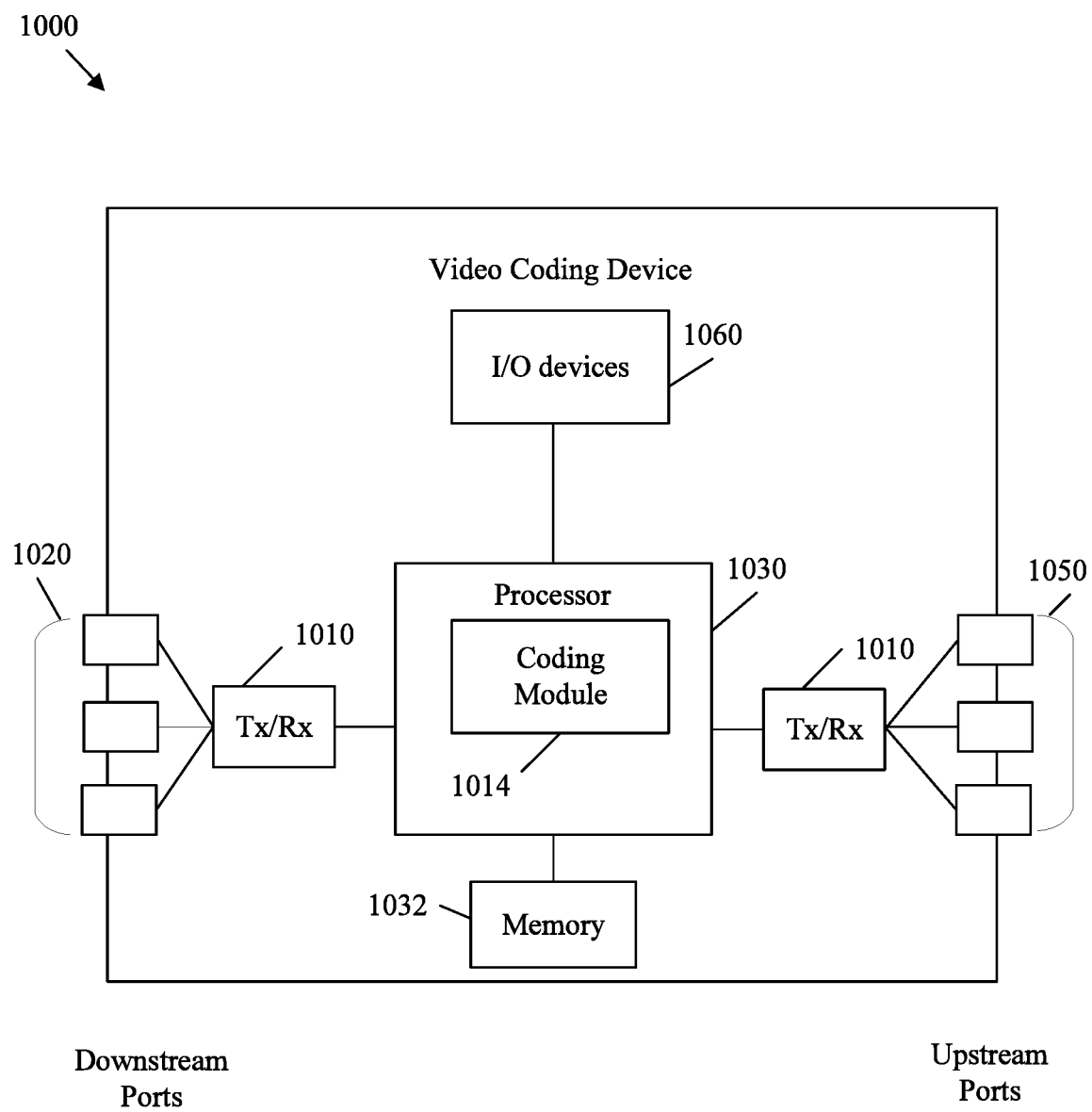
FIG. 10 is a schematic diagram of a video coding device.

FIG. 10 is a schematic diagram of a video coding device 1000 (e.g., a video encoder 300 or a video decoder 400) according to an embodiment of the disclosure. The video coding device 1000 is suitable for implementing the disclosed embodiments as described herein. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various codec functions. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an overflow data storage device, to store programs when such programs are selected for execution, and to store instructions and data that are read during program execution. The memory 1060 may be volatile and/or non-volatile and may be read-only memory (ROM), random access memory (RAM), ternary content-addressable memory (TCAM), and/or static random-access memory (SRAM).

Figure 11:
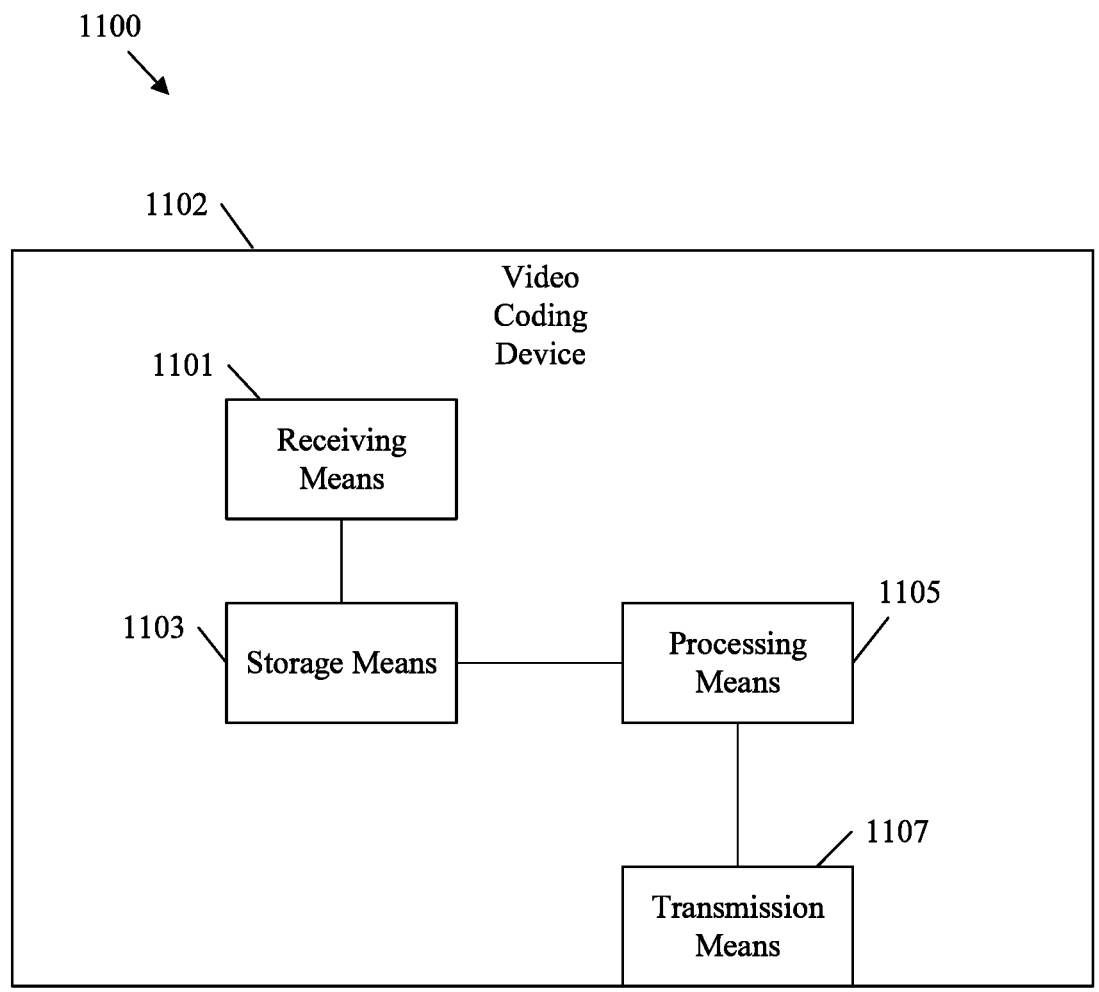
FIG. 11 is a schematic diagram of an embodiment of a means for coding.

FIG. 11 is a schematic diagram of an embodiment of a means for coding 1100. In an embodiment, the means for coding 1100 is implemented in a video coding device 1102 (e.g., a video encoder 300 or a video decoder 400). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions. The video coding device 1102 also includes processing means 1105. The processing means 1105 is coupled to the storage means 1103. The processing means 1105 is configured to execute the instructions stored in the storage means 1103 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, comprising:
receiving a bitstream including a sequence parameter set (SPS), a picture parameter set (PPS), and a plurality of subpictures associated with a subpicture identifier (ID) mapping, wherein the SPS includes an SPS flag;
determining whether the SPS flag has a first value or a second value, wherein the SPS flag having the first value specifies that the subpicture ID mapping is signaled in the SPS, and wherein the SPS flag having the second value specifies that the subpicture ID mapping is signaled in the PPS;
obtaining the subpicture ID mapping from the SPS when the SPS flag has the first value and from the PPS when the SPS flag has the second value; and
decoding the plurality of subpictures using the subpicture ID mapping.

2. The method of claim 1, wherein the PPS includes a PPS flag, and the method further comprises:
determining whether the PPS flag has the first value or the second value, wherein the PPS flag having the first value specifies that the subpicture ID mapping is signaled in the PPS, and wherein the PPS flag having the second value specifies that the subpicture ID mapping is not signaled in the PPS; and
obtaining the subpicture ID mapping from the PPS when the PPS flag has the first value.

3. The method of claim 2, wherein the SPS flag has the first value when the PPS flag has the second value, and wherein the SPS flag has the second value when the PPS flag has the first value.

4. The method of claim 1, wherein the first value is one and the second value is zero.

5. The method of claim 1, wherein the SPS includes a second SPS flag, and wherein the second SPS flag specifies whether the subpicture ID mapping is explicitly signaled in the SPS or the PPS.

6. The method of claim 1, wherein the bitstream further comprises a coded video sequence (CVS) change flag, and wherein the CVS change flag indicates whether the subpicture ID mapping is permitted to change within a coded video sequence (CVS) of the bitstream.

7. The method of claim 6, wherein the bitstream comprises a merged bitstream, and wherein the subpicture ID mapping has changed within the CVS of the bitstream.

8. A method implemented by an encoder, the method comprising:
encoding a bitstream including a sequence parameter set (SPS), a picture parameter set (PPS), and a plurality of subpictures associated with a subpicture identifier (ID) mapping, wherein the SPS includes an SPS flag;
setting the SPS flag to a first value when the subpicture ID mapping is signaled in the SPS and to a second value when the subpicture ID mapping is signaled in the PPS; and
storing the bitstream for communication toward a decoder.

9. The method of claim 8, further setting a PPS flag in the PPS to the first value when the subpicture ID mapping is signaled in the PPS and to the second value when the subpicture ID mapping is not signaled in the PPS.

10. The method of claim 9, wherein the SPS flag has the first value when the PPS flag has the second value, and wherein the SPS flag has the second value when the PPS flag has the first value.

11. The method of claim 8, wherein the first value is one and the second value is zero.

12. The method of claim 8, wherein the SPS includes a second SPS flag, and wherein the second SPS flag specifies whether the subpicture ID mapping is explicitly signaled in the SPS or the PPS.

13. The method of claim 8, wherein the bitstream further comprises a coded video sequence (CVS) change flag, and wherein the CVS change flag indicates whether the subpicture ID mapping may change within a coded video sequence (CVS) of the bitstream.

14. The method of claim 13, wherein the bitstream comprises a merged bitstream, and wherein the subpicture ID mapping has changed within the CVS of the bitstream.

15. A decoding device, comprising:
a receiver configured to receive a video bitstream including a sequence parameter set (SPS), a picture parameter set (PPS), and a plurality of subpictures associated with a subpicture identifier (ID) mapping, wherein the SPS includes an SPS flag;
a memory coupled to the receiver, the memory storing instructions; and
one or more processors coupled to the memory, the one or more processors configured to execute the instructions to cause the decoding device to:
determine whether the SPS flag has a first value or a second value, wherein the SPS flag having the first value specifies that the subpicture ID mapping is signaled in the SPS, and wherein the SPS flag having the second value specifies that the subpicture ID mapping is signaled in the PPS;
obtain the subpicture ID mapping from the SPS when the SPS flag has the first value and from the PPS when the SPS flag has the second value; and
decode the plurality of subpictures using the subpicture ID mapping.

16. The decoding device of claim 15, wherein the PPS includes a PPS flag, and the one or more processors further configured to:
determine whether the PPS flag has the first value or the second value, wherein the PPS flag having the first value specifies that the subpicture ID mapping is signaled in the PPS, and wherein the PPS flag having the second value specifies that the subpicture ID mapping is not signaled in the PPS; and
obtain the subpicture ID mapping from the PPS when the PPS flag has the first value.

17. The decoding device of claim 16, wherein the SPS flag has the first value when the PPS flag has the second value, wherein the SPS flag has the second value when the PPS flag has the first value, and wherein the first value is one and the second value is zero.

18. The decoding device of claim 15, wherein the SPS includes a second SPS flag, and wherein the second SPS flag specifies whether the subpicture ID mapping is explicitly signaled in the SPS or the PPS.

19. The decoding device of claim 15, wherein the video bitstream further comprises a coded video sequence (CVS) change flag, and wherein the CVS change flag indicates whether the subpicture ID mapping may change within a coded video sequence (CVS) of the video bitstream.

20. The decoding device of claim 19, wherein the video bitstream comprises a merged bitstream, and wherein the subpicture ID mapping has changed within the CVS of the video bitstream.

21. An encoding device, comprising:

a memory containing instructions;

one or more processors coupled to the memory, the one or more processors configured to implement the instructions to cause the encoding device to:

encode a bitstream including a sequence parameter set (SPS), a picture parameter set (PPS), and a plurality of subpictures associated with a subpicture identifier (ID) mapping, wherein the SPS includes an SPS flag;

set the SPS flag to a first value when the subpicture ID mapping is signaled in the SPS and to a second value when the subpicture ID mapping is signaled in the PPS;

set a PPS flag in the PPS to the first value when the subpicture ID mapping is signaled in the PPS and to the second value when the subpicture ID mapping is not signaled in the PPS; and a transmitter coupled to the one or more processors processor, the transmitter configured to transmit the bitstream toward a video decoder.

22. The encoding device of claim 21, wherein the SPS flag has the first value when the PPS flag has the second value, and wherein the SPS flag has the second value when the PPS flag has the first value.

23. The encoding device of claim 21, wherein the first value is one and the second value is zero.

24. The encoding device of claim 21, wherein the bitstream further comprises a coded video sequence (CVS) change flag, and wherein the CVS change flag indicates whether the subpicture ID mapping may change within a coded video sequence (CVS) of the bitstream.

25. The encoding device of claim 21, wherein the subpicture ID specifies a value of a second subpicture ID for the PPS in use, and wherein the second subpicture ID identifies the PPS for reference by syntax elements.

26. The encoding device of claim 24, wherein the bitstream comprises a merged bitstream, and wherein the subpicture ID mapping has changed within the CVS of the bitstream.

* * * * *

UNITED STATES PATENT AND TRADEMARK OFFICE
CERTIFICATE OF CORRECTION

PATENT NO. : 12,356,012 B2  
APPLICATION NO. : 17/696485  
DATED : July 8, 2025  
INVENTOR(S) : Ye-Kui Wang Page 1 of 2

It is certified that error appears in the above-identified patent and that said Letters Patent is hereby corrected as shown below:

In the Claims

Column 32, Claim 15, Lines 20-42, should read:
15. A decoding device, comprising:
    a receiver configured to receive a video bitstream including a sequence parameter set (SPS), a picture parameter set (PPS), and a plurality of subpictures associated with a subpicture identifier (ID) mapping, wherein the SPS includes an SPS flag;
    a memory coupled to the receiver, the memory storing instructions; and
    one or more processors coupled to the memory, the one or more processors configured to execute the instructions to cause the decoding device to:
determine whether the SPS flag has a first value or a second value, wherein the SPS flag having the first value specifies that the subpicture ID mapping is signaled in the SPS, and wherein the SPS flag having the second value specifies that the subpicture ID mapping is signaled in the PPS;
    obtain the subpicture ID mapping from the SPS when the SPS flag has the first value or from the PPS when the SPS flag has the second value; and
    decode the plurality of subpictures using the subpicture ID mapping.

Column 33, Claim 21, Lines 5-22, through Column 34, Lines 1-3, should read:
21. An encoding device, comprising:
    a memory containing instructions;
    one or more processors coupled to the memory, the one or more processors configured to implement the instructions to cause the encoding device to:
        encode a bitstream including a sequence parameter set (SPS), a picture parameter set (PPS), and a plurality of subpictures associated with a subpicture identifier (ID) mapping, wherein the SPS includes an SPS flag;
        set the SPS flag to a first value when the subpicture ID mapping is signaled in the SPS and to a second value when the subpicture ID mapping is signaled in the PPS;
        set a PPS flag in the PPS to the first value when the subpicture ID mapping is signaled in the PPS or to the second value when the subpicture ID mapping is not signaled in the PPS; and Signed and Sealed this  
Second Day of September, 2025

Coke Morgan Stewart  
*Acting Director of the United States Patent and Trademark Office* a transmitter coupled to the one or more processors, the transmitter configured to transmit the bitstream toward a video decoder.